US010915037B2

(12) United States Patent
Odagiri et al.

(10) Patent No.: US 10,915,037 B2
(45) Date of Patent: Feb. 9, 2021

(54) IMAGE FORMING APPARATUS THAT CONTROLS LIGHT INTENSITY FOR EXPOSURE

(71) Applicant: CANON KABUSHIKI KAISHA, Tokyo (JP)

(72) Inventors: Eriko Odagiri, Yokohama (JP); Fumiaki Mizuno, Nagoya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/666,226

(22) Filed: Aug. 1, 2017

(65) Prior Publication Data

US 2018/0074430 A1 Mar. 15, 2018

(30) Foreign Application Priority Data

Sep. 14, 2016 (JP) .................................. 2016-179982

(51) Int. Cl.
*G03G 15/043* (2006.01)
*H04N 1/29* (2006.01)
*H04N 1/40* (2006.01)

(52) U.S. Cl.
CPC ........... *G03G 15/043* (2013.01); *H04N 1/295* (2013.01); *H04N 1/40043* (2013.01); *H04N 2201/0082* (2013.01)

(58) Field of Classification Search
CPC .................................................. G03G 15/043
See application file for complete search history.

(56) References Cited

U.S. PATENT DOCUMENTS

| 6,370,175 B1* | 4/2002 | Ikeda ................ H04N 1/40037 |
| | | 347/236 |
| 7,003,241 B1* | 2/2006 | Kobayashi ............... B41J 2/473 |
| | | 250/205 |
| 7,633,515 B2 | 12/2009 | Tomioka ....................... 347/247 |

(Continued)

FOREIGN PATENT DOCUMENTS

| JP | H08-146328 | 6/1996 |
| JP | 2003-136777 | 5/2003 |

(Continued)

OTHER PUBLICATIONS

U.S. Appl. No. 15/491,648, filed Apr. 19, 2017.

(Continued)

*Primary Examiner* — Walter L Lindsay, Jr.
*Assistant Examiner* — Milton Gonzalez
(74) *Attorney, Agent, or Firm* — Venable LLP

(57) ABSTRACT

An image forming apparatus includes: an image carrier; a light source configured to emit light for exposing the image carrier; a controller configured to control a light intensity of the light source; a reference current generator configured to generate a reference current based on a target light intensity of the light source, the target light intensity being set by the controller; a correction current generator configured to generate a correction current for correcting the reference current based on an amount of correction that is set by the controller, and on the target light intensity; and a driver configured to drive the light source using a drive current that corresponds to a difference between the reference current and the correction current.

19 Claims, 11 Drawing Sheets

(56) References Cited

U.S. PATENT DOCUMENTS

| | | | | |
|---|---|---|---|---|
| 7,675,532 B2* | 3/2010 | Iida | ...................... | G03G 15/043 347/132 |
| 7,982,760 B2* | 7/2011 | Koga | ................... | G03G 15/043 347/236 |
| 8,502,851 B2 | 8/2013 | Koga | ........................... | 347/236 |
| 8,599,413 B2* | 12/2013 | Morita | ................. | G03G 15/043 358/1.13 |
| 8,723,907 B2* | 5/2014 | Takezawa | .......... | G03G 15/5037 347/235 |
| 8,724,163 B2* | 5/2014 | Seki | .................. | G06K 7/10613 347/224 |
| 8,803,938 B2* | 8/2014 | Furuta | ................ | G03G 15/5058 347/253 |
| 8,896,648 B2* | 11/2014 | Omori | .................. | G03G 15/043 347/130 |
| 8,957,932 B2* | 2/2015 | Koga | .................. | G03G 15/043 347/130 |
| 9,041,757 B2* | 5/2015 | Hayakawa | ............. | G03G 15/80 347/237 |
| 2008/0144132 A1 | 6/2008 | Koga | ............................ | 358/475 |
| 2011/0228355 A1 | 9/2011 | Morita et al. | ................. | 358/475 |
| 2011/0236047 A1 | 9/2011 | Koga | .............................. | 399/51 |

FOREIGN PATENT DOCUMENTS

| | | |
|---|---|---|
| JP | 2004-288869 | 10/2004 |
| JP | 2006-192770 | 7/2006 |
| JP | 2007-216428 | 8/2007 |
| JP | 2008-152091 | 7/2008 |
| JP | 2011-025502 | 2/2011 |
| JP | 2011-215582 | 10/2011 |

OTHER PUBLICATIONS

U.S. Appl. No. 15/634,889, filed Jun. 27, 2017.
Office Action dated Aug. 28, 2020 in counterpart Japanese Application No. 2016-179982, together with English translation thereof.

* cited by examiner

IMAGE FORMING APPARATUS THAT CONTROLS LIGHT INTENSITY FOR EXPOSURE

BACKGROUND OF THE INVENTION

Field of the Invention

The present invention relates to an image forming apparatus that exposes an image carrier to form an image, and relates more specifically to a technique to control light intensity for this exposure.

Description of the Related Art

An electrophotographic image forming apparatus forms an electrostatic latent image on a photosensitive member by scanning and exposing, with a light beam, the photosensitive member, which serves as an image carrier, and forms an image by developing this electrostatic latent image using toner. Here, the exposure intensity on the photosensitive member may become uneven depending on the image height due to characteristics of an optical system for exposing the photosensitive member, the light incident angle relative to the optical system, or the like. When the exposure intensity on the photosensitive member is uneven, the density of a formed image becomes uneven, and the image quality is thus degraded. Japanese Patent Laid-open No. H8-146328 and Japanese Patent Laid-open No. 2006-192770 disclose a configuration that controls light emission intensity of a light source so that the exposure intensity on a photosensitive member is uniform regardless of the image height. In Japanese Patent Laid-Open No. 2006-192770, an amount of correction of a drive current for the light source is obtained in advance for each image height, and a correction current corresponding to this amount of correction is generated by a digital/analog (D/A) converter. The drive current is then corrected using the generated correction current to change the light emission intensity of the light source, thereby making the exposure intensity on the photosensitive member uniform.

In the configuration in Japanese Patent Laid-Open No. 2006-192770, the level of the correction current to be generated is determined only by the amount of correction. Accordingly, the amount of change in the correction current at the time of changing the amount of correction by a given value is the same regardless of the exposure intensity on the photosensitive member, and the amount of change in the light emission intensity of the light source is also the same accordingly. That is to say, the amount of change in the light emission intensity of the light source per unit amount of correction is the same. Accordingly, if the exposure intensity on the photosensitive member is reduced, the ratio of the minimum value of the amount of change in the light emission intensity of the light source to the exposure intensity on the photosensitive member increases. This means that the resolution in the correction decreases.

SUMMARY OF THE INVENTION

According to an aspect of the present invention, an image forming apparatus includes: an image carrier; a light source configured to emit light for exposing the image carrier; a controller configured to control a light intensity of the light source; a reference current generator configured to generate a reference current based on a target light intensity of the light source, the target light intensity being set by the controller; a correction current generator configured to generate a correction current for correcting the reference current based on an amount of correction that is set by the controller, and on the target light intensity; and a driver configured to drive the light source using a drive current that corresponds to a difference between the reference current and the correction current.

Further features of the present invention will become apparent from the following description of exemplary embodiments with reference to the attached drawings.

DESCRIPTION OF THE EMBODIMENTS

Exemplary embodiments of the present invention will be hereinafter described with reference to the drawings. Note that the following embodiments are examples and are not intended to limit the present invention to the contents of the embodiments. In the following drawings, constituent elements that are not required for description of the embodiments will be omitted.

First Embodiment

Figure 1:
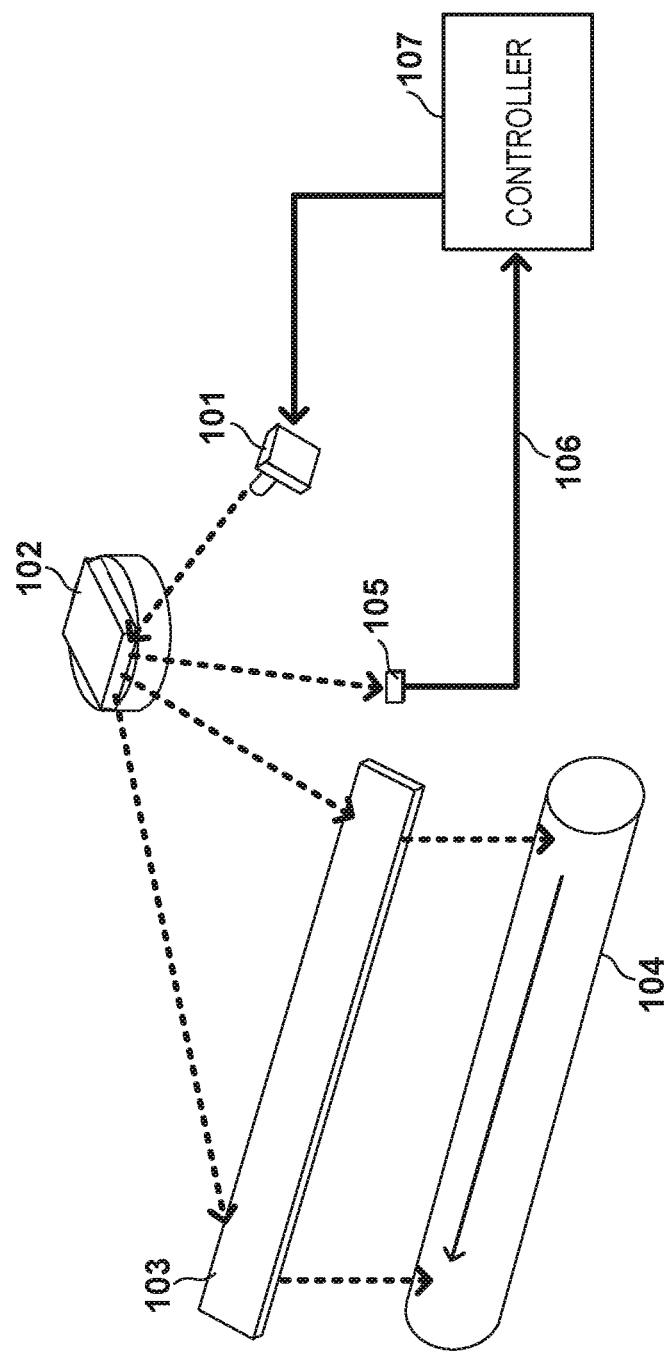
FIG. 1 is a diagram showing an exposure control configuration of an image forming apparatus according to an embodiment.

FIG. 1 shows an exposure control configuration of an image forming apparatus according to this embodiment. Light emitted by a light source 101 is reflected at a rotary polygon mirror 102 and a reflecting mirror 103, and a photosensitive member 104, which serves as an image carrier, is irradiated with the reflected light. Upon rotating the rotary polygon mirror 102, the light with which the photosensitive member 104 is irradiated moves on the surface of the photosensitive member 104 in the direction of a thin solid-line arrow in the diagram, and the photosensitive member 104 is thus scanned. The light reflected at the rotary polygon mirror 102 is also incident on a synchronization sensor 105 in accordance with a rotational position of the rotary polygon mirror 102. The synchronization sensor 105 outputs, to a controller 107, a synchronizing signal 106 that indicates the timing at which the light was detected (synchronization timing). The controller 107 controls the light source 101 to expose the photosensitive member 104 based on the synchronizing timing indicated by the synchronizing signal 106.

Figure 2:
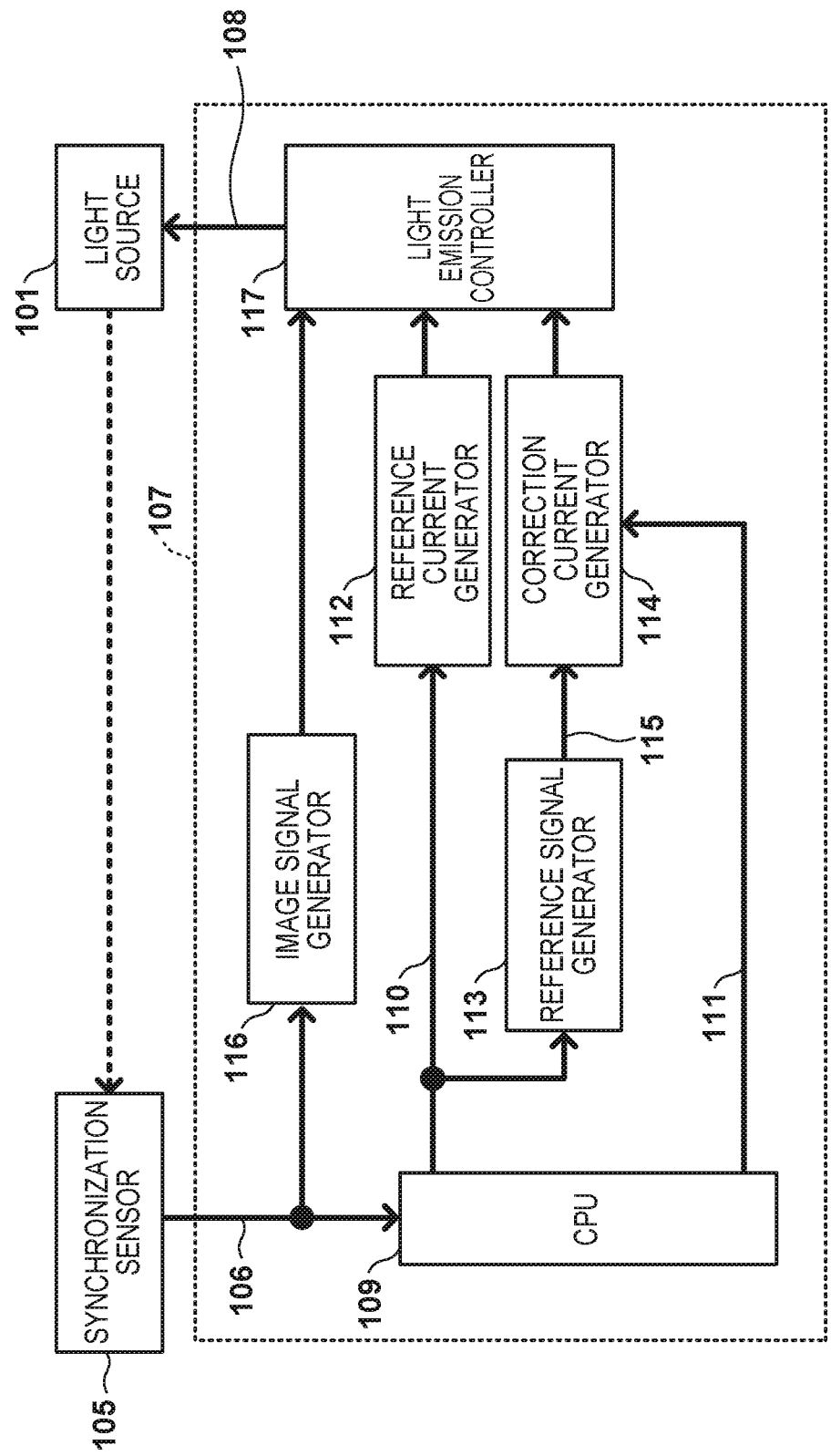
FIG. 2 is a block diagram of the exposure control configuration of the image forming apparatus according to an embodiment.

FIG. 2 is a configuration diagram of the controller 107. A CPU 109 outputs a light intensity control signal 110 and a correction signal 111. A reference current generator 112 generates a drive reference current that corresponds to the light intensity control signal 110, and outputs the generated drive reference current to a light emission controller 117. A reference signal generator 113 generates a correction reference signal 115 based on the light intensity control signal 110 and outputs the generated correction reference signal 115 to a correction current generator 114. The correction current generator 114 generates a correction current based on the correction signal 111 and the correction reference signal 115, and outputs the generated correction current to the light emission controller 117. An image signal generator 116 generates a light emission control signal to turn on and off light emission of the light source 101 based on image data, and outputs the generated light emission control signal to the light emission controller 117. The light emission controller 117 generates a drive current 108 by subtracting the correction current from the drive reference current, and causes the light source 101 to emit light using this drive current 108. Note that, at this time, the light emission controller 117 controls the turning on and off of light emission of the light source 101 in accordance with the light emission control signal. Note that the image signal generator 116 and the CPU 109 output signals based on the synchronization timing serving as a reference, the synchronization timing being indicated by the synchronizing signal 106 output by the synchronization sensor 105.

Figure 3:
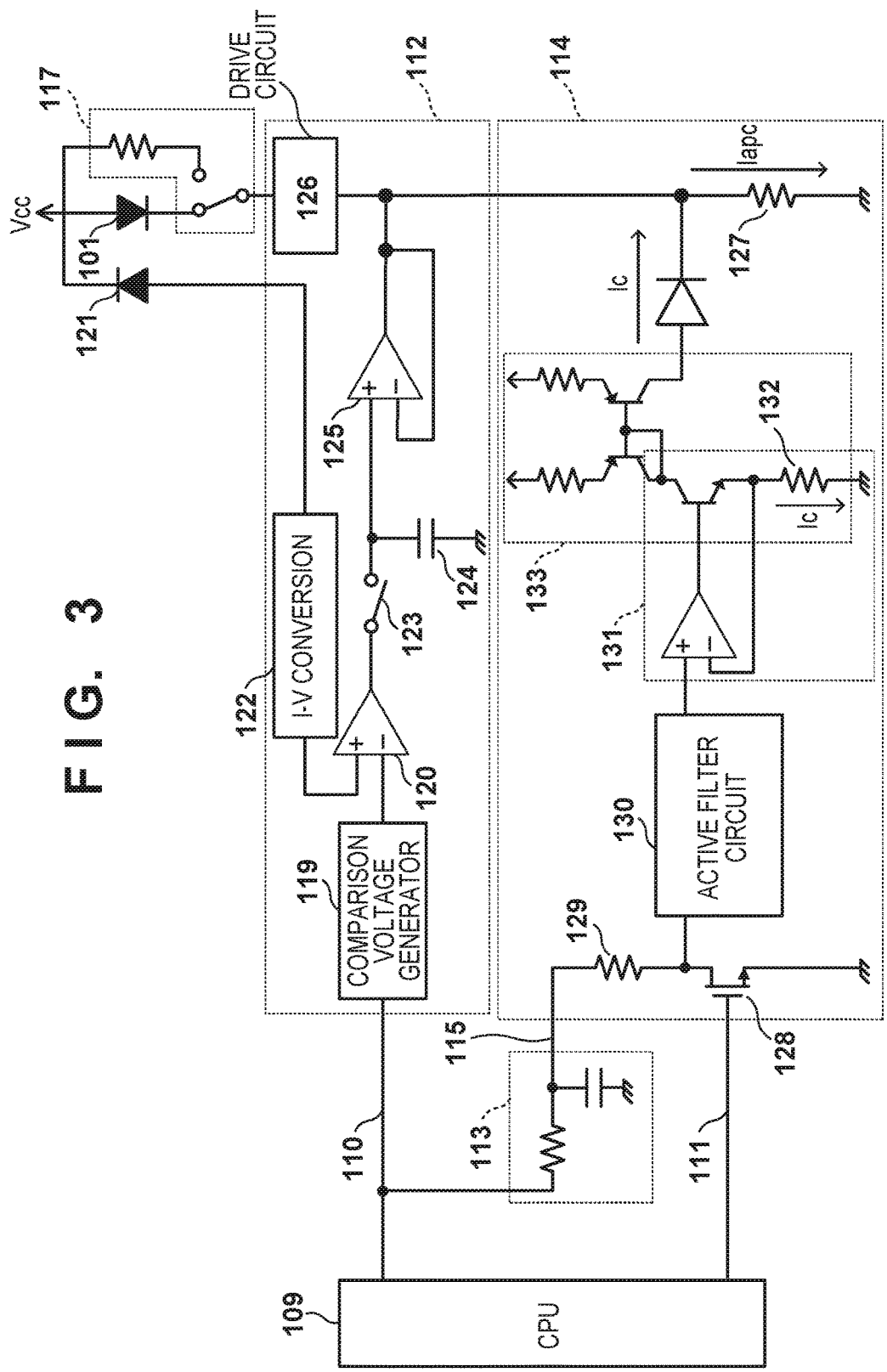
FIG. 3 is a diagram showing the details of the exposure control configuration of the image forming apparatus according to an embodiment.

A description will be given below, using FIG. 3, of the details of the reference current generator 112, the reference signal generator 113, and the correction current generator 114. The light intensity control signal 110 is a pulse width modulation signal (hereinafter referred to as a PWM signal), and the CPU 109 outputs a PWM signal having a duty ratio that corresponds to a target light intensity. Note that, as an example in this embodiment, it is assumed that the higher the target light intensity, the higher the proportion of high level. A comparison voltage generator 119 converts the light intensity control signal 110 into a DC voltage, and inputs this DC voltage to a minus terminal of a comparator 120. The higher the proportion of high level of the PWM signal, which is the light intensity control signal 110, the higher the amplitude of the DC voltage output by the comparison voltage generator 119. That is to say, the amplitude of the DC voltage output by the comparison voltage generator 119 indicates the target light intensity. Also, a light-receiver 121, which is for example a photodiode, receives the light emitted by the light source 101, and outputs, to an I-V converter 122, a current that corresponds to the intensity of the received light. The I-V converter 122 converts this current into a voltage and inputs this voltage to a plus terminal of the comparator 120. Thus, the voltage input to the plus terminal of the comparator 120 by the I-V converter 122 indicates the light emission intensity of the light source 101. The comparator 120 outputs a voltage that indicates a difference between the voltage output by the comparison voltage generator 119 and the voltage output by the I-V converter 122. During automatic power control (hereinafter referred to as APC), a switch 123 is set to an ON state, and a capacitor 124 is charged with the output voltage of the comparator 120. The charging voltage of the capacitor 124 is input to a voltage follower, which is constituted by an op-amp 125, and the op-amp 125 outputs a voltage that is equal to the charging voltage of the capacitor 124. A drive circuit 126 controls a drive current 108 that flows through a resistor 127 from the light source 101. With this feedback configuration, the light emission intensity of the light source 101 converges to the target light intensity. The drive current 108 at this time is a drive reference current Iapc. Note that, after APC has ended, the switch 123 is set to an OFF state.

In this embodiment, the correction signal 111 is also a PWM signal, and the correction signal 111 is input to a gate of an FET 128 to control the turning on and off of the FET 128. The FET 128 is pulled up by a resistor 129, and is connected to the reference signal generator 113. The reference signal generator 113 constitutes a filter, and outputs a DC voltage obtained by smoothing the light intensity control signal 110, which is a PWM signal, as the correction reference signal 115 to an end of the resistor 129. Accordingly, if the correction signal 111 is high, a low-level signal is input to an active filter circuit 130, and if the correction signal 111 is low, a high-level signal is input to the active filter circuit 130. That is to say, a PWM signal whose logic is inverted with respect to that of the correction signal 111 and whose level, i.e. amplitude is equal to that of the correction reference signal 115 is input to the active filter circuit 130. The active filter circuit 130 smoothes the input PWM signal and inputs the smoothed PWM signal to a V-I converter 131. In the V-I converter 131, a current Ic that corresponds to the value of the smoothed DC voltage flows through a resistor 132. A current mirror circuit 133 outputs a correction current Ic that has the same value as that of the current flowing through the resistor 132.

As mentioned above, when an image is formed, the switch 123 is set to an OFF state, and a voltage applied during the immediately previous APC is held at the capacitor 124. Accordingly, if the current mirror circuit 133 outputs the correction current Ic, the drive circuit 126 sets the value of the drive current 108 flowing through the light source 101 to a value obtained by subtracting the correction current Ic from the drive reference current Iapc, in order to keep the current flowing through the resistor 127 at the drive reference current Iapc. Thus, the light emission intensity of the light source 101 decreases. In this manner, the light emission intensity of the light source 101 can be controlled by controlling the value of the correction current Ic. Here, the correction current Ic changes in accordance with the voltage output by the active filter circuit 130. Note that the voltage output by the active filter circuit 130 is a voltage obtained by smoothing the signal obtained by logically inverting the correction signal 111, which is a PWM signal, and having an amplitude value corresponding to the correction reference signal 115. Accordingly, the value of the correction current Ic can be controlled by changing the duty ratio of the correction signal 111.

In this embodiment, the CPU 109 changes the duty ratio of the correction signal 111 in 256 steps, for example. While the photosensitive member 104 is being scanned to form an image, the CPU 109 changes the duty ratio of the correction signal 111 in accordance with the image height thereof. Thus, the correction current Ic changes in accordance with the image height, and accordingly, the exposure intensity can be changed during the scan. Note that, in order to make the exposure intensity on the photosensitive member 104 uniform during one scan, the relationship between the image height, i.e. the scanning position and the duty ratio of the correction signal 111 is obtained in advance and is stored in the image forming apparatus.

Figure 4:
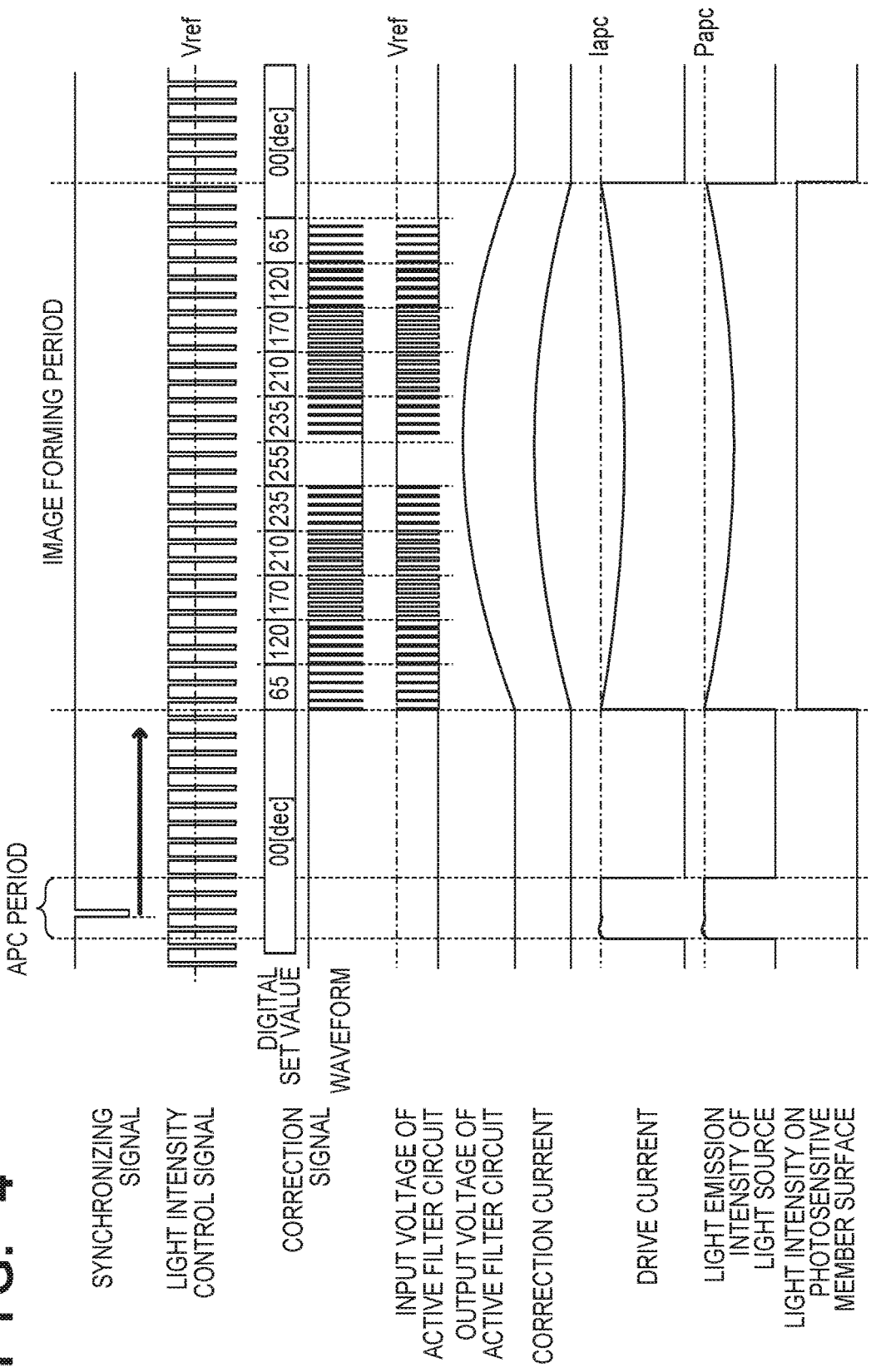
FIG. 4 is a diagram showing signals output during exposure control according to an embodiment.

FIG. 4 shows signals output during exposure of one scan line. Initially, before scanning this scan line, APC is performed based on a target light intensity Papc of the light source 101 to determine the drive reference current Ipac. After a given time has elapsed since the synchronization timing indicated by the synchronizing signal, the image signal generator 116 outputs a light emission control signal, and the CPU 109 outputs the correction signal 111. As mentioned above, the level of the DC voltage generated based on the light intensity control signal 110 corresponds to the target light intensity, and this level of the DC voltage generated by the light intensity control signal 110 is denoted as Vref in FIG. 4. Note that the level Vref is also the level of the correction reference signal 115 output by the reference signal generator 113. FIG. 4 shows digital set values, which indicate the duty ratio of the correction signal 111, and waveforms of the PWM signals that are based on these digital set values. Note that, in this embodiment, it is assumed that the greater the digital set value, the higher the proportion of low level of correction signal 111. A signal whose level is equal to the level Vref of the correction reference signal 115 and that is logically inverted with respect to the correction signal 111 is input to the active filter circuit 130, and the active filter circuit 130 then outputs a signal obtained by smoothing this input signal. Accordingly, as shown in FIG. 4, the output level of the active filter circuit 130 changes in accordance with the duty ratio of the correction signal 111. As mentioned above, the correction current Ic changes in accordance with a change in the level of the active filter circuit 130. The drive current 108 is a current obtained by subtracting the correction current Ic from the drive reference current Iapc, and accordingly, the drive current 108 decreases as the correction current Ic increases, as shown in FIG. 4. For this reason, the light emission intensity of the light source also changes similar to the drive current 108. For example, in the case where the light intensity on the photosensitive member surface changes in accordance with the image height under a certain drive current 108, the relationship between the image height and the correction current is obtained in advance so as to cancel this change, and the correction current is increased or reduced based on this relationship during scanning. Thus, the light intensity on the photosensitive member surface can be kept uniform regardless of the image height, as shown in FIG. 4.

As further depicted in FIG. 4, a section indicated by value "255" (first section) is an example of a center section of the image forming region, and a section indicated by value "65" (second section) is an example of a section placed on an end portion of the image forming region. The second section (65) is closer to an end portion of an image area of the image carrier than the first section (255). In FIG. 4, LIGHT INTENSITY EMISSION shows that an intensity (second light intensity) corresponding to the second section (65) is greater than an intensity (first light intensity) corresponding to the first section (255).

Figure 5:
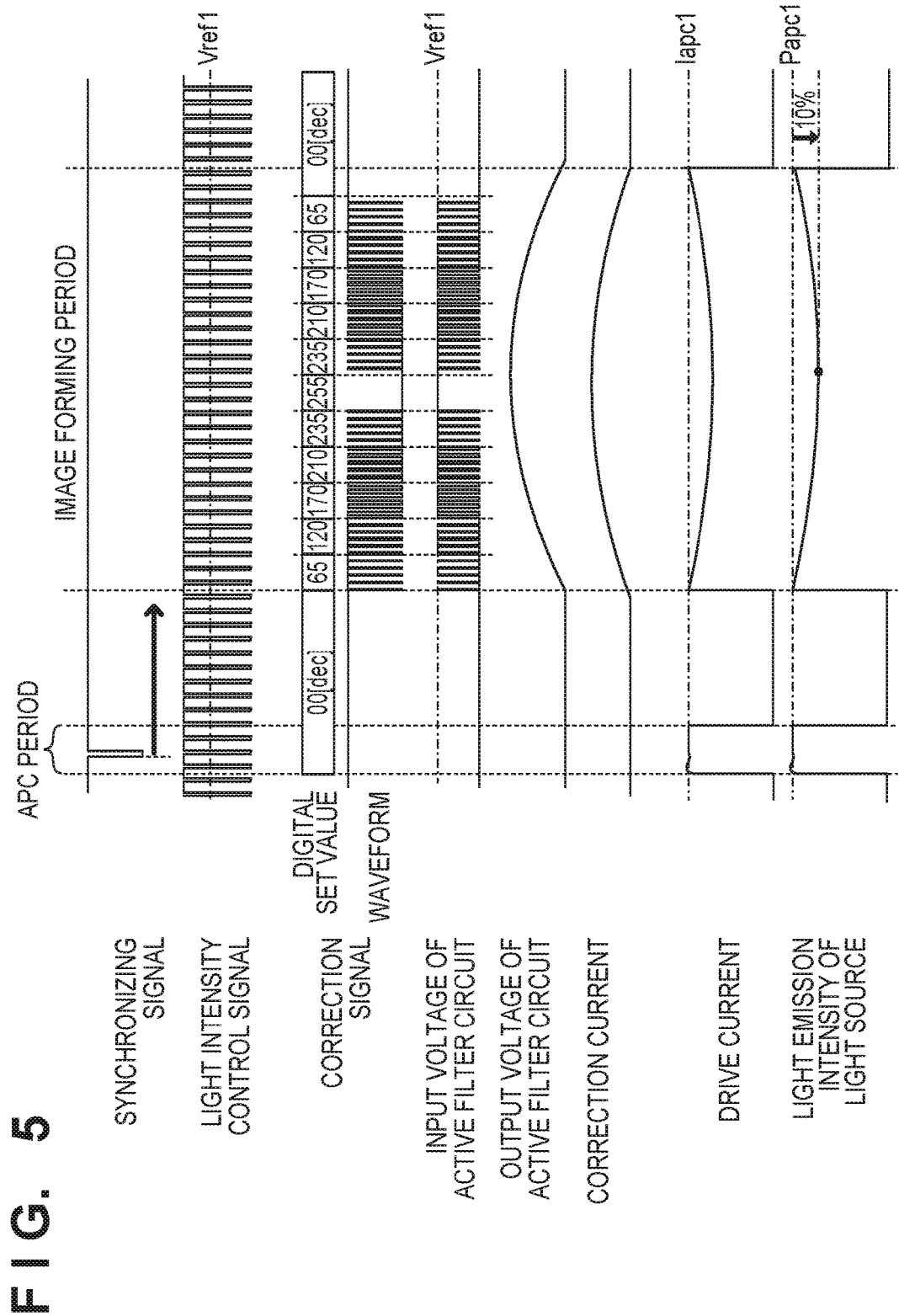
FIG. 5 is a diagram showing signals output during exposure control according to an embodiment.
Figure 6:
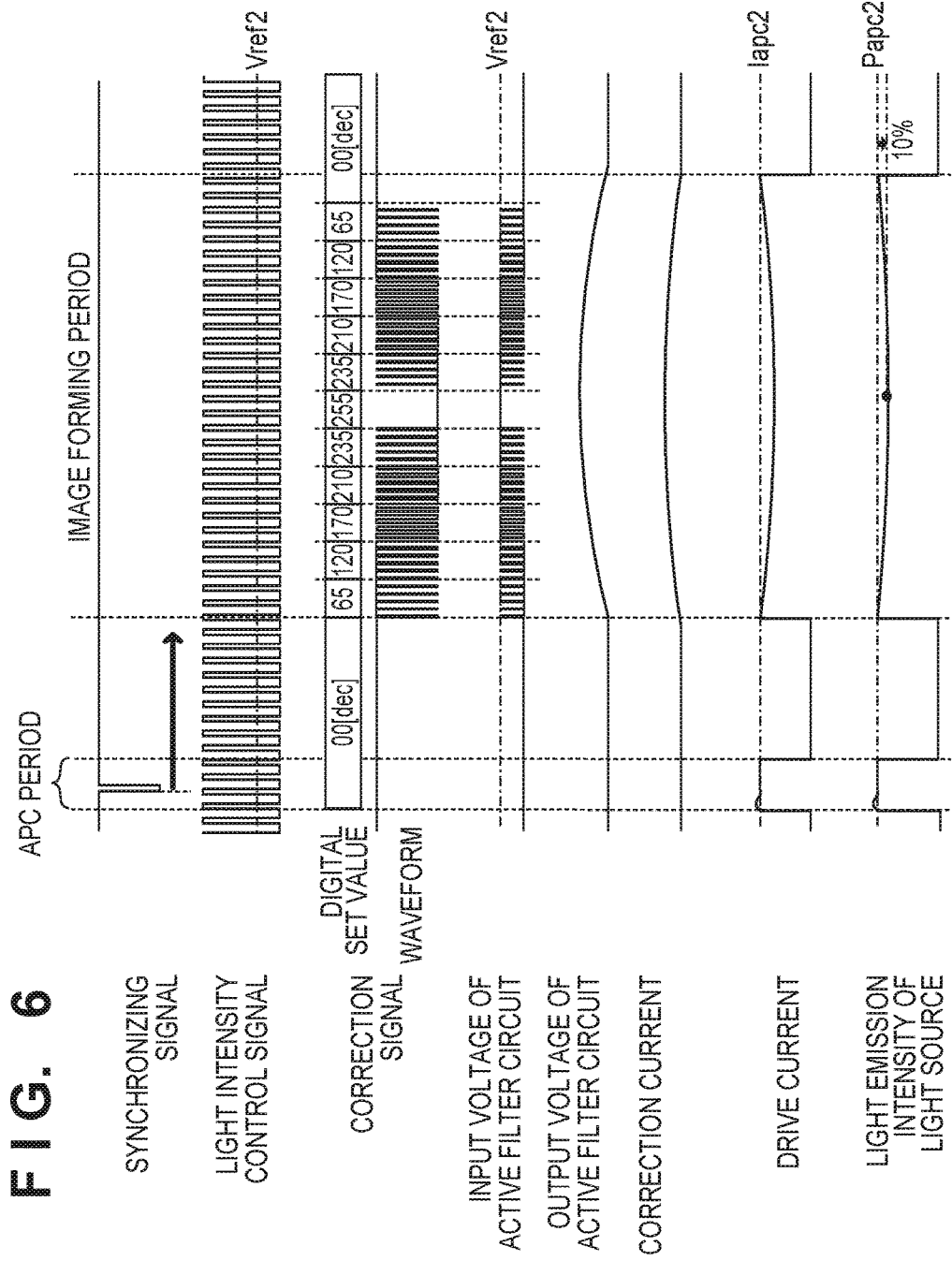
FIG. 6 is a diagram showing signals output during exposure control according to an embodiment.

FIG. 5 shows waveforms of the signals at the time of scanning one scan line when the target light intensity is Papc1, and FIG. 6 shows waveforms of the signals at the time of scanning one scan line when the target light intensity is Papc2. Note that the target light intensity Papc2 is a value that is half the target light intensity Papc1. Both FIGS. 5 and 6 show an example in which the target light intensity is reduced by 10% at most. Vref1 in FIG. 5 and Vref2 in FIG. 6 correspond respectively to the target light intensity Papc1 and the target light intensity Papc2, and accordingly, the level of Vref2 is half the level of Vref1. Note that the digital set values corresponding to the duty ratio of the correction signal 111 are the same in FIGS. 5 and 6. Accordingly, the duty ratio of the input voltage of the active filter circuit 130 is the same in FIGS. 5 and 6, but the amplitude thereof is different. Specifically, the level of the input voltage of the active filter circuit 130 in FIG. 5 is Vref1, and is Vref2 in FIG. 6. Accordingly, the level of the output voltage of the active filter circuit 130 differs dependently of the level of the correction reference signal 115, and therefore, the level of the correction current Ic also differs. That is to say, the level of the correction current Ic depends on both the level of the correction reference signal 115 and the amount of correction indicated by the correction signal 111. With this configuration, even if the target light intensity is changed, the resolution for light intensity correction can be maintained.

As further depicted in FIGS. 5 and 6, FIG. 5 shows a case in which a target light intensity is Papc1, and FIG. 6 shows a case in which a target light intensity is Papc2, which is smaller than Papc1. Thus, in a case where a first target light intensity corresponds to Papc2, and a second target light intensity corresponds to Papc1, Papc2 is smaller than Papc1.

As further examples depicted in these figures, in a case that the first correction amount is "255", a second amount of change in driving current corresponds to a difference between a drive current corresponding to a section indicated by "255" and Iapc1 in FIG. 5, and a first amount of change in driving current corresponds to a difference between a drive current corresponding to a section indicated by "255" and Iapc2 in FIG. 6. As is clear from FIGS. 5 and 6, the second amount is larger than the first amount.

Moreover, as discussed above in connection with FIGS. 5 and 6, in a case that the correction amount is constant, it follows that when the target light intensity is larger, the correction current is larger. Stated another way, a second correction current (corresponding to a case where the target light intensity is a second target light intensity) is larger than a first correction current (corresponding to a case where the target light intensity is a first target light intensity).

A configuration may be employed in which, for example, the target light intensity is changed in accordance with information regarding degradation of the photosensitive member 104. The information regarding degradation of the photosensitive member 104 may be the operating time of the photosensitive member 104, or may be the number of rotations thereof. A configuration may be employed in which the target light intensity is determined in accordance with the rotational speed of the photosensitive member 104. The rotational speed of the photosensitive member 104 is determined based on the type of the recording medium on which an image is to be formed.

Second Embodiment

Figure 7:
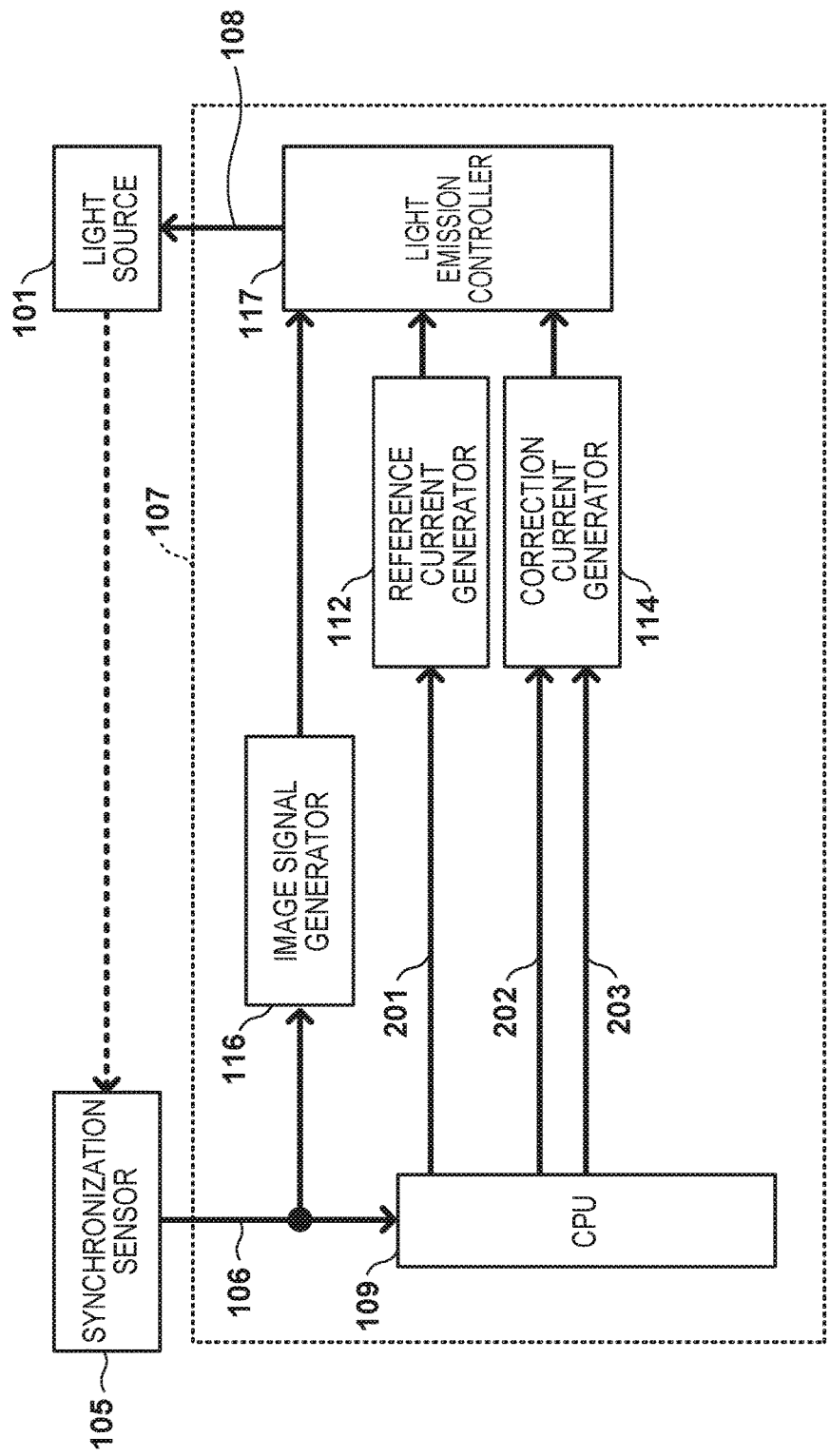
FIG. 7 is a block diagram of an exposure control configuration of an image forming apparatus according to an embodiment.

Subsequently, the second embodiment will be described, mainly regarding differences from the first embodiment. FIG. 7 is a configuration diagram of the controller 107 according to this embodiment. In the first embodiment, the light intensity control signal 110 is a PWM signal, and the CPU 109 notifies the reference current generator 112 of the target light intensity using a PWM signal. In this embodiment, the reference current generator 112 is notified of the target light intensity using a light intensity control signal 201, which indicates the target light intensity with a digital value. In addition, in the first embodiment, the light intensity control signal 110 is converted into the correction reference signal 115 to notify the correction current generator 114 of the target light intensity. In this embodiment, the CPU 109 outputs a correction reference signal 203, which is a DC voltage that indicates a target light intensity level, to the correction current generator 114. Furthermore, in the first embodiment, the correction signal 111 is also a PWM signal. In this embodiment, the CPU 109 outputs, to the correction current generator 114, a correction signal 202, which indicates the level of the correction current Ic with a digital value. Since both the correction signal 202 and the light intensity control signal 201 are digital signals, a configuration may be employed in which the CPU 109, the reference current generator 112, and the correction current generator 114 are connected via a bus, and the correction signal 202 and the light intensity control signal 201 are transmitted through serial communication.

Figure 8:
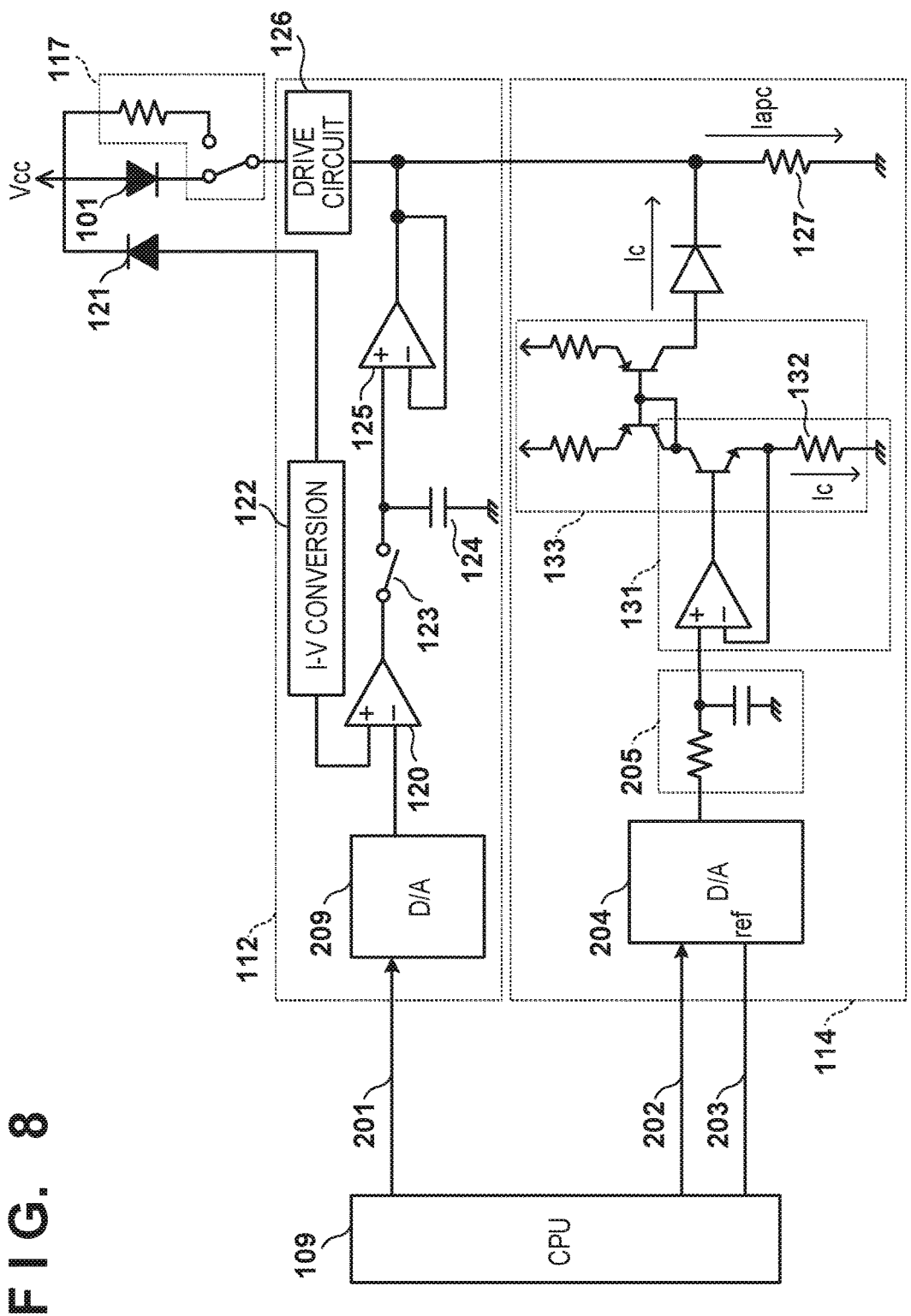
FIG. 8 is a diagram showing the details of the exposure control configuration of the image forming apparatus according to an embodiment.

A detailed description will be given below, using FIG. 8, of the reference current generator 112 and the correction current generator 114 according to this embodiment. A digital/analog converter 209 in the reference current generator 112 converts the digital value indicated by the light intensity control signal 201 from the CPU 109 into an analog signal, and outputs a DC voltage having an amplitude that corresponds to the target light intensity to the minus terminal of the comparator 120. Other configuration and operation of the reference current generator 112 are the same as those in the first embodiment, and the reference drive current Iapc to serve as the target light intensity is determined through APC.

The correction reference signal 203 and the correction signal 202 are input to a digital/analog converter 204 in the correction current generator 114. The digital/analog converter 204 outputs a DC voltage that corresponds to the digital value indicated by the correction signal 202 based on the DC voltage value of the correction reference signal 203, the DC voltage value serving as a reference. For example, it is assumed that the amount of correction is adjusted in 256 steps, i.e. the maximum value of the amount of correction is a digital value of 255. In this case, when the level of the correction reference signal 203 is denoted as Vref and the digital value of the correction signal 202 is denoted as x (x is an integer of 0 to 255), the digital/analog converter 204 outputs a DC voltage of Vref×(x/255). The output signal of the digital/analog converter 204 is smoothed by a low pass filter 205 and is input to the V-I converter 131. Other configuration and operation of the correction current generator 114 are the same as those in the first embodiment. In this embodiment as well, Vref is a level that corresponds to the target light intensity, and the output of the digital/analog converter 204 differs depending on the target light intensity, even if the value indicated by the correction signal 202 is the same. Accordingly, the same resolution can be maintained regardless of the target light intensity.

Figure 9:
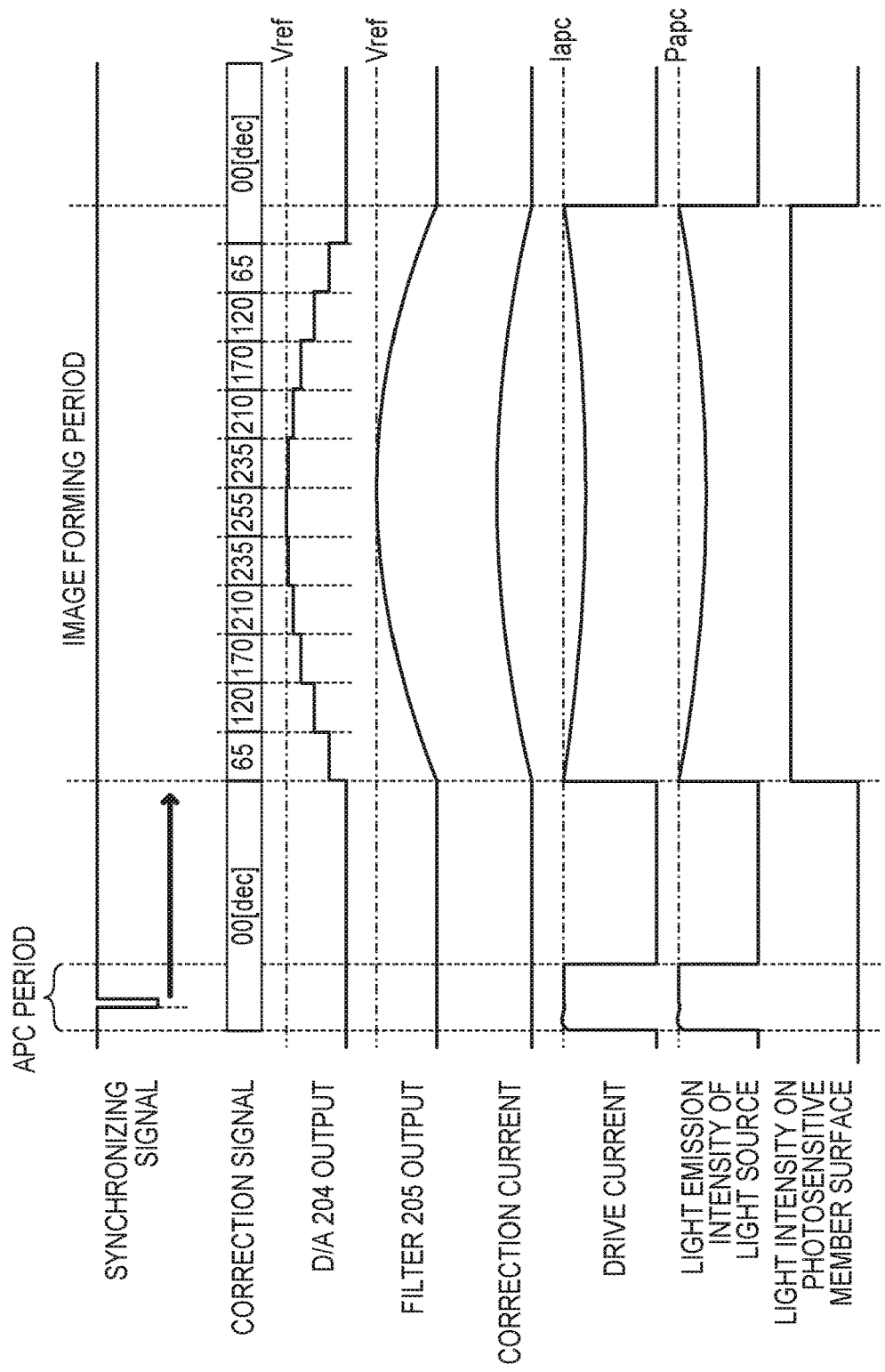
FIG. 9 is a diagram showing signals output during exposure control according to an embodiment.

FIG. 9 shows signals output during exposure of one scan line. Before scanning this scan line, APC is performed based on the target light intensity Papc of the light source 101 to determine the drive reference current Iapc, similar to the first embodiment. After a given time has passed since the synchronization timing indicated by the synchronizing signal, the image signal generator 116 outputs the light emission control signal, and the CPU 109 outputs the correction signal 202 and the correction reference signal 203. In FIG. 9, Vref denotes the voltage of the correction reference signal 203. As shown in FIG. 9, the digital/analog converter 204 outputs a signal having an amplitude that corresponds to the digital value indicated by the correction signal 202. The output of the digital/analog converter 204 is smoothed by a filter 205. The output of the filter 205 corresponds to the correction current Ic.

Figure 10:
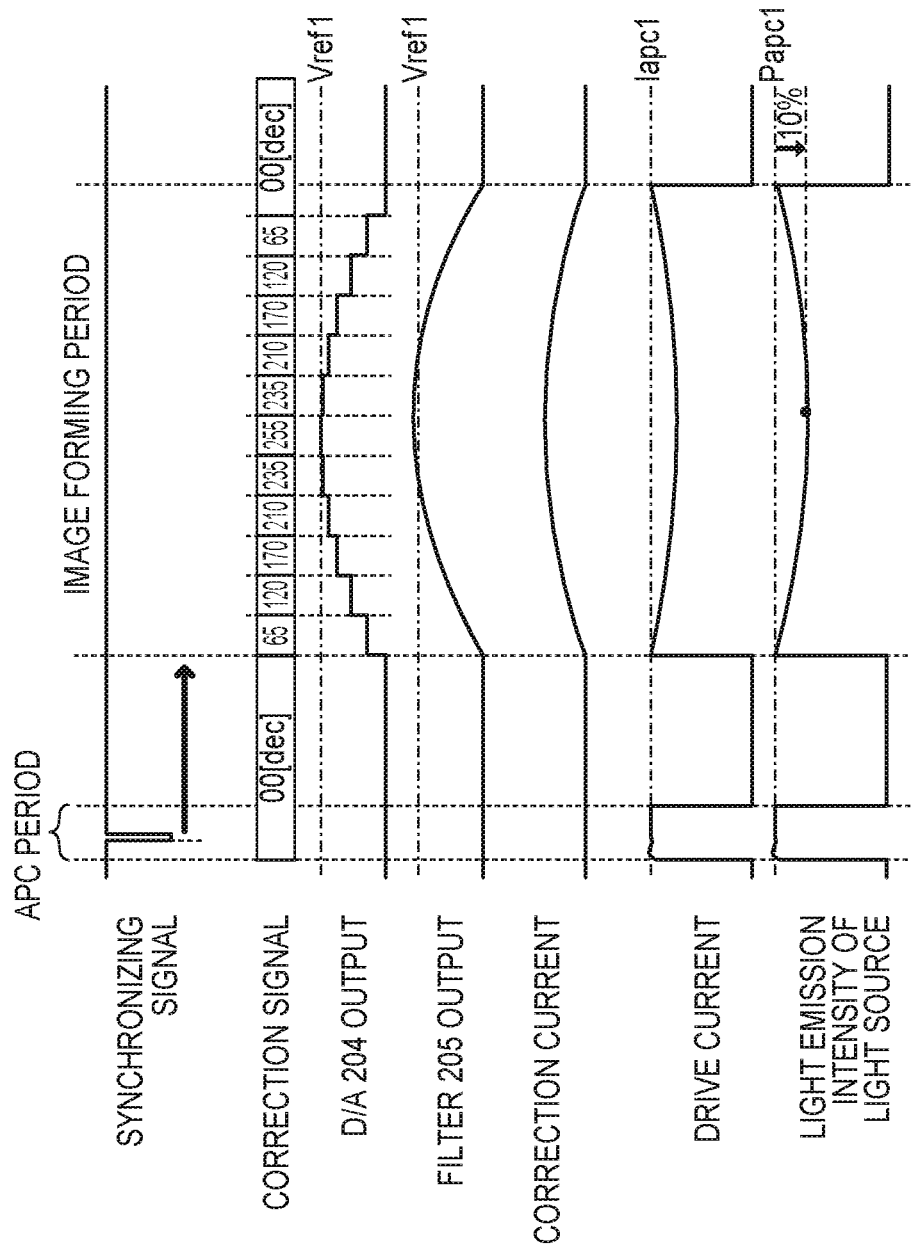
FIG. 10 is a diagram showing signals output during exposure control according to an embodiment.
Figure 11:
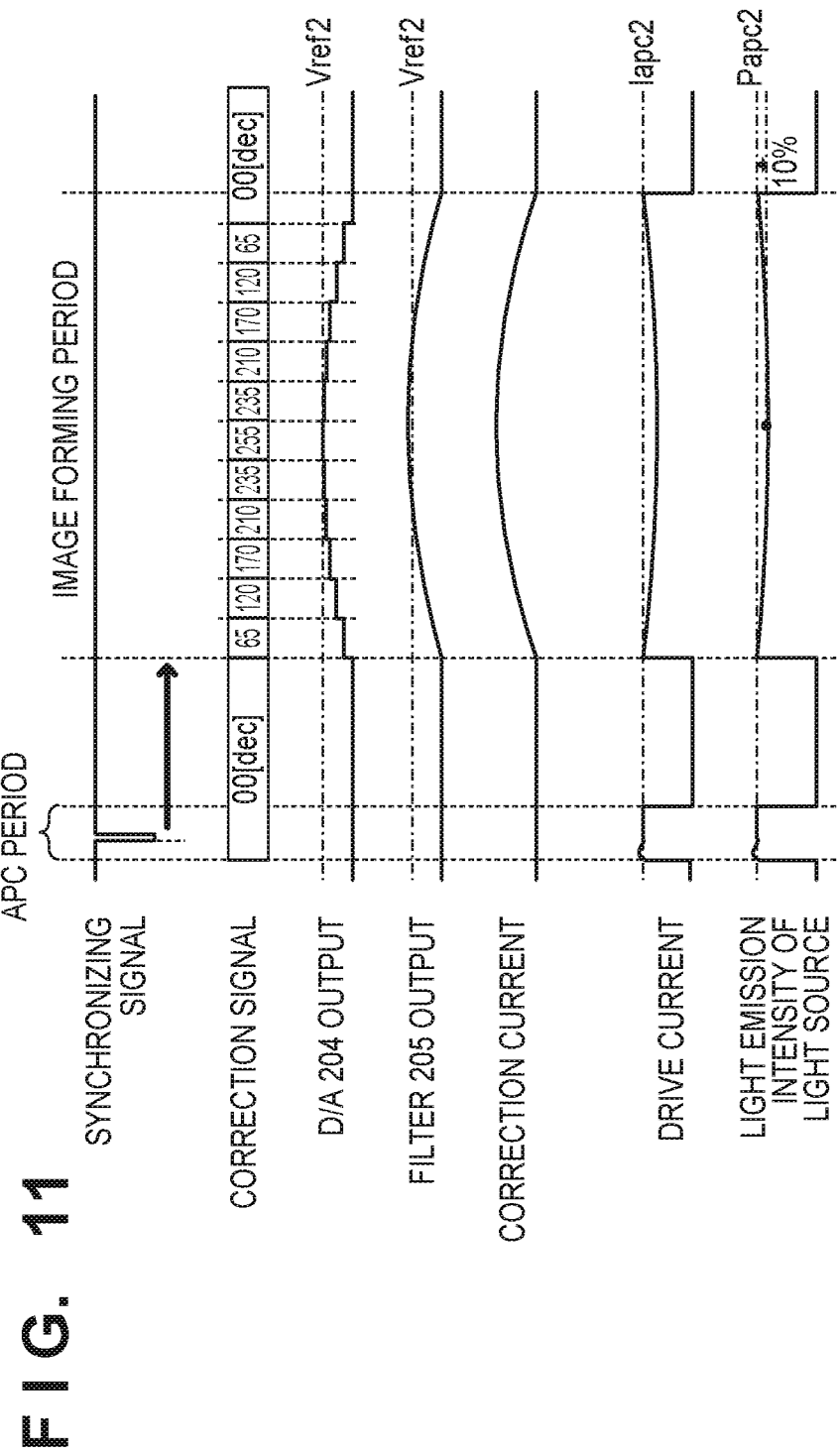
FIG. 11 is a diagram showing signals output during exposure control according to an embodiment.

FIG. 10 shows waveforms of the signals at the time of scanning one scan line when the target light intensity is Papc1, and FIG. 11 shows waveforms of the signals at the time of scanning one scan line when the target light intensity is Papc2. Note that the target light intensity Papc2 is a value that is half the target light intensity Papc1. Both FIGS. 10 and 11 show an example in which the target light intensity is reduced by 10% at most. Vref1 in FIG. 10 and Vref2 in FIG. 11 correspond respectively to the target light intensity Papc1 and the target light intensity Papc2, and accordingly, the amplitude Vref2 is a value that is half the amplitude Vref1. Note that the digital set value at each image height indicated by the correction signal 202 is the same in FIGS. 10 and 11. Although the correction signal 202 indicates a correction value in 256 steps as in the first embodiment, the amplitude of the correction current Ic is scaled in accordance with the target light intensity. Accordingly, even if the target light intensity is changed, the resolution for light intensity correction can be maintained.

Other Embodiments

Embodiments of the present invention can also be realized by a computer of a system or apparatus that reads out and executes computer executable instructions (e.g. one or more programs) recorded on a storage medium (which may also be referred to more fully as a 'non-transitory computer-readable storage medium') to perform the functions of one or more of the above-described embodiments and/or that includes one or more circuits (e.g. application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g. central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-179982, filed on Sep. 14, 2016, which is hereby incorporated by reference herein in its entirety.

What is claimed is:

1. An image forming apparatus comprising:
an image carrier;
a light source configured to emit light for exposing the image carrier;
a controller configured to control a light intensity of the light source;
a reference current generator configured to generate a reference current based on a target light intensity of the light source, the target light intensity being set by the controller;
a correction current generator configured to generate a correction current based on both an amount of correction set by the controller and the target light intensity; and
a driver configured to generate a driving current by subtracting the correction current from the reference current, and to drive the light source using the generated drive current,
wherein the correction current increases as the target light intensity increases.

2. The image forming apparatus according to claim 1, wherein the greater the amount of correction, the higher a level of the correction current.

3. The image forming apparatus according to claim 1, wherein the correction current generator is further configured to generate the correction current based on a first signal indicating a level that corresponds to the target light intensity output by the controller, and on a second signal indicating the amount of correction.

4. The image forming apparatus according to claim 3, wherein the second signal is a pulse width modulation signal having a duty ratio that corresponds to the amount of correction, and
the correction current generator is further configured to generate the correction current by converting, into a direct current, a signal having the same duty ratio as that of the pulse width modulation signal and an amplitude that corresponds to the level indicated by the first signal.

5. The image forming apparatus according to claim 3, wherein the first signal is a pulse width modulation signal having a duty ratio that corresponds to the target light intensity, and
the reference current generator is further configured to generate the reference current based on the first signal.

6. The image forming apparatus according to claim 3, wherein the second signal is a digital signal that indicates the amount of correction as a digital value, and
the correction current generator is further configured to generate the correction current by converting the digital signal into an analog signal based on the level indicated by the first signal, the level serving as a reference.

7. The image forming apparatus according to claim 6, wherein the correction current generator is further configured to generate the correction current having a level obtained by multiplying the level indicated by the first signal by a proportion of the amount of correction indicated by the second signal to a maximum value of the amount of correction.

8. The image forming apparatus according to claim 7, wherein the controller outputs a third signal indicating the target light intensity, and
the reference current generator is further configured to generate the reference current based on the third signal.

9. The image forming apparatus according to claim 8, wherein the third signal is a digital signal that indicates the target light intensity as a digital value.

10. The image forming apparatus according to claim 1, wherein the controller is further configured to set the target light intensity based on information regarding degradation of the image carrier, or a rotational speed of the image carrier.

11. The image forming apparatus according to claim 1, further comprising:
a scanner configured to scan the image carrier with the light emitted by the light source; and
a storage configured to store information indicating a relationship between an amount of correction and a position at which the scanner is scanning the image carrier,
wherein the controller is further configured to set the amount of correction based on the information stored in the storage.

12. The image forming apparatus according to claim 1, further comprising:
a scanner configured to scan, in a main-scanning direction, the image carrier with the light emitted by the light source,
wherein the controller sets the light intensity of the light source to a first light intensity while scanning a first section in the main-scanning direction, and sets the light intensity of the light source to a second light intensity while scanning a second section in the main-scanning direction,
the second section is closer to an end portion of an image area of the image carrier than the first section, and
the second light intensity is greater than the first light intensity.

13. An image forming apparatus comprising:
an image carrier;
a light source configured to emit light for exposing the image carrier;
a scanner configured to scan, in a main-scanning direction, the image carrier with the light emitted by the light source,
a controller configured to control a light intensity of the light source; and
a driver configured to drive the light source using a drive current that is obtained based on a target light intensity of the light source and a correction amount, the correction amount depending on a scanned section in the main-scanning direction, the drive current decreasing as the correction amount increases,
wherein, in a case that the target light intensity is a first target light intensity and the correction amount is a first correction amount, the driving current is changed by a first amount, and
in a case that the target light intensity is a second target light intensity greater than the first target light intensity and the correction amount is the first correction amount, the driving current is changed by a second amount larger than the first amount.

14. The image forming apparatus according to Claim 13, further comprising:
a reference current generator configured to generate a reference current based on the target light intensity of the light source, the target light intensity being set by the controller; and
a correction current generator configured to generate a correction current based on both the correction amount set by the controller and the target light intensity, wherein the driving current is obtained based on the reference current and the correction current.

15. The image forming apparatus according to Claim 14, wherein, in a case that the target light intensity is the first target light intensity and the correction amount is the first correction amount, the correction current is a first correction current, and in a case that the target light intensity is the second target light intensity and the correction amount is the first correction amount, the correction current is a second correction current larger than the first correction current.

16. The image forming apparatus according to Claim 13, wherein the controller sets the light intensity of the light source to a first light intensity while scanning a first section in the main-scanning direction, and sets the light intensity of the light source to a second light intensity while scanning a second section in the main-scanning direction, the second section is closer to an end portion of an image area of the image carrier than the first section, and the second light intensity is greater than the first light intensity.

17. An image forming apparatus comprising:
an image carrier;
a light source configured to emit light for exposing the image carrier;
a scanner configured to scan, in a main-scanning direction, the image carrier with the light emitted by the light source;
a controller configured to control a light intensity of the light source; and
a driver configured to drive the light source using a drive current that is obtained based on a scanned section in the main-scanning direction, wherein, in a case that a target light intensity of the light source is a first target light intensity, a difference between a first drive current used to drive the light source to scan a first section and a second drive current used to drive the light source to scan a second section closer to an end portion of an image area of the image carrier than the first section is a first value, wherein, in a case that the target light intensity of the light source is a second target light intensity smaller than the first target intensity, a difference between a third drive current used to drive the light source to scan the first section and a fourth drive current used to drive the light source to scan the second section is a second value, and wherein the first value is larger than the second value.

18. The image forming apparatus according to claim 17, further comprising:
a reference current generator configured to generate a reference current based on the target light intensity of the light source, the target light intensity being set by the controller; and
a correction current generator configured to generate a correction current based on both a correction amount set by the controller and the target light intensity,
wherein the drive current is obtained based on the reference current and the correction current.

19. The image forming apparatus according to claim 18, wherein a first correction current generated by the correction current generator in a case that the correction amount is a first amount and the target light intensity is the first target light intensity is larger than a second correction current generated by the correction current generator in a case that the correction amount is the first amount and the target light intensity is the second target light intensity.

* * * * *